May 11, 1926.

R. WELCKER

TANK CAR

Filed May 9, 1923

1,584,338

INVENTOR
Rudolph Welcker

BY Chapin & Neal
ATTORNEYS

Patented May 11, 1926.

1,584,338

UNITED STATES PATENT OFFICE.

RUDOLPH WELCKER, OF SPRINGFIELD, MASSACHUSETTS.

TANK CAR.

Application filed May 9, 1923. Serial No. 637,909.

On November 23, 1921, I filed an application, Serial No. 517,400, for improvements in transportation of solid materials in bulk form. This present invention is an improvement upon the invention of said former application. But in some features this invention is independent of the earlier one as will appear from the claims.

According to the principal feature of my present invention I provide means associated with a tank car to function during the unloading operation and characterized by the relation of the center of gravity of the total load within the tank to the unloading operation. By this means and relation the unloading operation is controlled in a better manner than heretofore. Other features will appear in the annexed claims. While the invention is disclosed as embodied in a railroad freight car, it is equally applicable for construction on the chassis of an automobile truck.

The problem and the means to serve for a useful solution will be clear from the sufficient showing of one embodiment in the accompanying drawings of which the following is a description.

Figure 1:
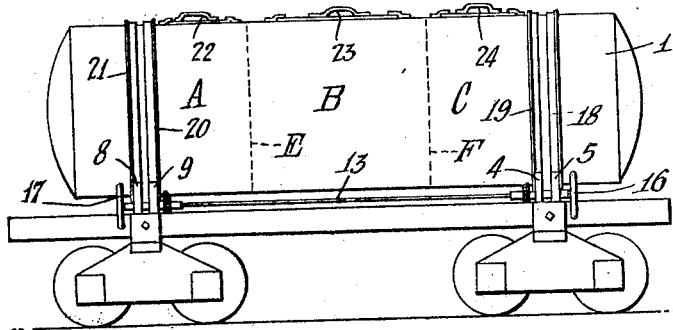
Figure 2:
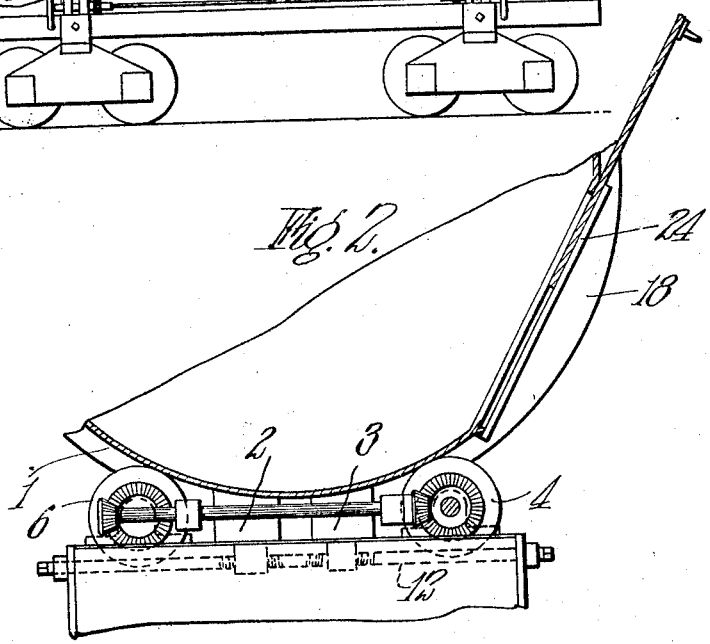
Figure 3:
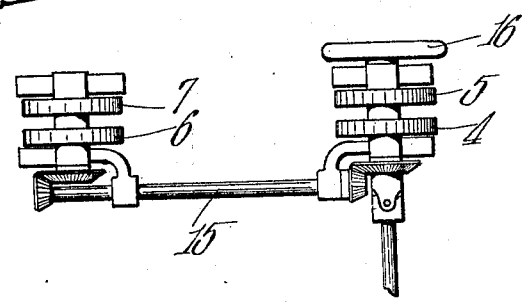
Figure 3:
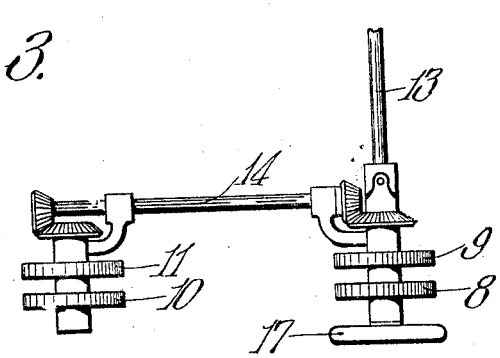

Fig. 1 is a side view of a railroad tank car with my means attached to it;

Fig. 2 is a detail sectional view indicating the position of the oppositely disposed wedges for supporting the tank over one of the car trucks during transportation; some of the spaced rolls for supporting the tank and rotating it during the unloading operation; and the means to move the wedges and rolls; and Fig. 3 is a detail view illustrating the arrangement of supporting rolls and driving means therefor in rather a diagrammatic manner.

A tank car 1 when full carries an enormous load. Among my objects is to unload the tank in a new and better manner. As explained in my copending case supra the tank may be supported from the car body by pairs of wedges 2 and 3 (arranged over the trucks at each end of the car), slidable in suitable ways toward each other to take up the weight of the tank from underneath and slidable away from each other to let the weight of the tank rest on the rolls 4, 5, 6, 7, 8, 9, 10, and 11. While the tank is under way on the road it may be desirable to have the tank weight borne and shared by all the wedges and all the rolls to better withstand the extreme shocks given a car in freight service. But when the tank is being unloaded its weight is preferably placed entirely on the rolls. The position of the wedges determine where the weight is.

In Fig. 2 I have indicated wedges 2 and 3 connected by depending extensions for relative transverse movements under the tank to the right and left hand threaded shaft 12. By turning the latter, the wedges are either forced into wedge supporting position under tank 1 or away from such position to permit the tank to rest on the rolls. This figure indicates the arrangement of wedges at one end of the tank car and the arrangement at the other end is the same.

It is advisable to state now that I fully realize the particular arrangement and the choice of the particular mechanical elements indicated in the drawings may not appeal to a designer of freight cars of this class, but I rely upon the practical skill of this class of designers to determine the workman-like design for actual car building operations. My disclosure is purposely based upon a simple arrangement of parts to better illustrate the principles and functions whereby the invention may be applied and by this means to avoid confusion by the injection of purely engineering details into this description.

A pair of the rolls 4 to 11 (above referred to) mounted on shafts in suitable bearings is arranged just outside of each wedge at each of the four corners of the tank. All of these rolls are connected through shafts 14 and 15 and the universal jointed shaft 13 (Fig. 3) for rotation at one time by either of the hand wheels 16 and 17 located at opposite ends of the car. Power instead of hand means is desirable when available to rotate these shafts.

Circumferential flanged tracks 18, 19, 20, and 21 are fastened on the tank 1 upon which tracks the rolls 4 to 11 bear in the way indicated clearly in Fig. 1. This arrangement of tracks and rolls serve nicely as an additional means with the wedges to hold the tank 1 immovable when the car is under way.

According to my invention I divide the tank car 1 into a plurality of compartments in the form shown as compartments A, B, and C. The interior transverse walls E and F are indicated in Fig. 1 for this purpose. These compartments are provided with individual doors of any suitable kind indicated as 22, 23, and 24 for compartments A, B, and C.

In operation assume the tank car with all compartments full. With a tank car of standard length and loaded with cement, sand, or wheat, a full load is extremely heavy. Now, if the door 24 is opened, the wedges drawn back for the tank to rest entirely on its supporting rolls, and the rolls rotated, the tank will be rotated by frictional engagement with the four pairs of rolls. This rotation will bring the opening of door 24 gradually from its upper position in Fig. 1 to the lower position in Fig. 2. During this movement the load in compartment C gradually slides through the opening in a direction to clear the side of the car until compartment C is emptied. But during this movement doors 22 and 23 are closed so that the portions of the total load in compartments A and B are not unloaded. The compartments are unloaded successively by successively turning the tank on the rolls.

During the unloading operation as the load slides out one of the door openings, its center of gravity is constantly changing. It is shifted from a point in the longitudinal vertical plane of the cylindrical tank to a point away from said plane on the side opposite the unloading side. The weight of the unloading portion therefore is shifted by the rotation of the tank and resists such rotation by the force determined according to the leverage between the shifting center of gravity (in the load in one compartment) and said plane. But by my arrangement the load in compartments A and B maintains its center of gravity practically on the central axis of the tank cylinder. The result is that the force resisting the unloading rotation of the tank is substantially minimized as compared to any arrangement by which the whole load in the tank is moved to contribute its weight is resisting the force of rotation. As a consequence, less force is necessary to unload a tank car by my arrangement and this is of prime importance where it is frequently desirable to unload a car at a place on the railroad where sufficient force is either unavailable or expensive.

There are many advantages in making a tank car available for more universal use in carrying freight and my invention contributes to this end. One feature of advantage is the simplicity of the tank rotating means. By controlling a very heavy load so that the shifting of the center of gravity of only successive portions contributes to resist the unloading operation, I do not need as expensive or as complicated mechanism to apply the force of rotation to the tank as I otherwise would. I have illustrated plain rolls to apply the force of rotation to the tank and this indicates my point of economy and simplicity. By minimizing the force required there is less chance for slips with this simple means. Of course gears instead of rolls, engaging ring gears on the tank instead of tracks may be needed for the power application where the force is too great for a frictional drive. But even where gears need to be used, the means by which I can lower the minimum force required for unloading material having the enormous weight such as can be carried by a standard tank car, makes such a car of more general application in railroad use.

I claim:

1. A tank car divided into several transverse compartments having openings and closures for the separate compartments, means to rotatably support the tank on the car, means on the car to rotate the tank in unloading operations with the opening in one compartment free to discharge its load while the closure remains over the opening in another compartment to retain its load.

2. A tank car comprising in combination a car frame, a rotatable load carrying tank body thereon, means to rotate the tank, said tank being divided into separate transverse load carrying compartments, devices to open and close the load carrying compartments in any position of the tank's rotation.

3. A tank car comprising in combination a car frame, a closed load carrying tank thereon divided into separate transverse compartments, each provided with an opening for unloading, means to rotate said body, and separately operable closures for said openings, said tank being rotatable with one compartment closed and one compartment open.

4. A dump car comprising in combination a car frame, a closed load carrying body thereon, divided into transverse compartments having dumping openings therein but provided with separately operable closures for said openings, means to rotate said body on the truck frame to move said openings downwardly towards the side of the car frame in the dumping operations, said closures being operable independently of the car frame.

5. A railroad tank car comprising in combination a car frame, a tank thereon divided into separate transverse compartments with openings in each and having separately operable closures for the openings, transverse circumferential tracks on the tank, rolls mounted on the car frame engaging said tracks and adapted to bear the whole weight of the tank, and means to drive said rolls to rotate the tank by frictional engagement with said tracks.

6. A tank car comprising in combination a car frame, a rotatably supported closed tank body on the frame said body being divided into separate transverse compartments with indepenedent doors, means located on the car frame at each end of the tank for engaging said tank and devices to operate said means for rotating the tank through said engagement, said doors being constructed to rotate with said tank.

7. A dump car having in combination, a rotatable load carrying tank divided into a plurality of compartments transversely of its axis of rotation, means to hold or release the load in each compartment as desired when the tank turns on its axis whereby said tank may be rotated for successive unloading operations from the several compartments.

In testimony whereof I have affixed my signature.

RUDOLPH WELCKER.